United States Patent Office 2,841,525
Patented July 1, 1958

2,841,525
BIOLOGICAL TOXICANTS

Gail H. Birum and William E. Weesner, Dayton, Ohio, assignors to Monsanto Chemical Company, St. Louis, Mo., a corporation of Delaware No Drawing. Application April 18, 1956
Serial No. 578,861

19 Claims. (Cl. 167—33)

This invention relates to biological toxicant compositions containing sulfur and phosphorus atoms which may be prepared by reacting chlorinated trithiane with an alkylxanthate salt and an alkyl or haloalkyl phosphite ester.

Trithiane is a trimer of the sulfur analogue of formaldehyde, having the formula $(-CH_2S-)_3$, i. e.,

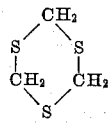

The literature reports the chlorination of trithiane with a variety of chlorinating agents, such as chlorine, sulfuryl chloride, thionyl chloride, sulfur monochloride, sulfur dichloride, etc. Apparently the first step in the chlorination process is the cleavage of the trithiane ring. The chlorination products which have been isolated and identified include chloromethyl sulfides and disulfides and sulfenyl chlorides; in aqueous solution, sulfones are reported to be formed. Exhaustive chlorination may replace all of the hydrogen atoms present in the reaction mixture. However, no complete investigation of the composition of the complex reaction mixture appears to have been published and the precise nature of this chlorination product remains indeterminate at the present date.

In accordance with the present invention, the complex reaction mixture which is the product of chlorination of trithiane under substantially anhydrous conditions to introduce from one to three moles of molecular chlorine per mole of trithiane into the chlorination product is reacted, simultaneously or in two separate stages, with an alkylxanthate salt and an alkyl or haloalkyl phosphorous acid ester.

The phosphorous acid esters useful in the present process are those of the formula $(RO)_2PXR'$ where R is selected from alkyl and haloalkyl radicals, R' is selected from R and alkali metals, and X is an atom of a non-metallic element of group 6A of the periodic table having an atomic weight below 40, i. e., X is oxygen or sulfur. One class of phosphorous acid esters of the above formula are trialkyl phosphites, wherein R and R' are alkyl and X is oxygen, e. g., trimethyl phosphite, triethyl phosphite, tri-n-propyl phosphite, triisoamyl phosphite, trihexyl phosphite, tris(2-ethylhexyl) phosphite, trinonyl phosphite, tri-tert-dodecyl phosphite, tris(2-butyloctyl) phosphite, tri-tridecyl phosphite, trihexadecyl phosphite, diethyl propyl phosphite, amyl dimethyl phosphite, dibutyl dodecyl phosphite, diheptyl methyl phosphite, butyl ethyl propyl phosphite, etc. Other phosphites useful in the present process are those in which at least one of R or R' in the above formula is haloalkyl, such as tris(2-chloroethyl) phosphite, bis(2-chloroethyl) ethyl phosphite, bis(2-chloroethyl) methyl phosphite, 4-chlorobutyl diethyl phosphite, tris(2-bromoethyl) phosphite, bis(2-bromoethyl) n-butyl phosphite, tris(2-chloropropyl) phosphite, tris(2,2,2-trichloroethyl) phosphite, etc.; and those in which R and R' are alkyl or haloalkyl and X is sulfur, such as triethyl phosphorothioite, tris(2-chloroethyl) phosphorothioite, triisobutyl phosphorothioite, S-ethyl O,O-di-n-propyl phosphorothioite, etc.

Instead of triesters of phosphorous acid, there may alternatively be employed in the reaction with chlorinated trithiane, alkali metal salts of diesters of phosphorous and phophorothioöus acid, i. e., the phosphorous acid esters of the above formula where R' is an alkali metal. Both phosphites, in which the X of the above formula is oxygen, and phosphorothioites, in which X in the above formula represents sulfur, are readily available in the form of the diester alkali metal salts. As examples of dialkyl phosphite and phosphorothioite salts useful in the present process may be listed sodium dimethyl phosphite, sodium di-n-butyl phosphite, potassium diethyl phosphite, potassium amyl dodecyl phosphite, sodium dihexyl phosphite, potassium bis(2-ethylhexyl) phosphite, lithium diethyl phosphite; sodium O,O-dimethyl phosphorothioite, sodium O,O-diethyl phosphorothioite, sodium O,O-diisopropyl phosphorothioite, potassium O,O-diethyl phosphorothioite, sodium O,O-dioctyl phosphorothioite, etc. Salts of phosphorothious and phosphorous acid bis(haloalkyl) and mixed alkyl-haloalkyl esters which may be reacted with chlorinated trithiane in accordance with the invention include sodium bis(2-chloroethyl) phosphite, sodium bis(2-chloropropyl) phosphite, sodium 2,2,2-trichloroethyl ethyl phosphite, sodium O,O-bis(2-chloroethyl) phosphorothioite, sodium O,O-bis(2-chloropropyl) phosphorothioite, etc.

The alkylxanthate salts useful in the present process are those of the formula

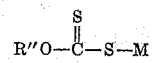

where R" is an alkyl radical and M represents an alkali metal. As exemplary of alkylxanthates of the above formula may be listed, e. g., sodium methylxanthate, sodium ethylxanthate (i. e., sodium xanthate), sodium n-propylxanthate, potassium isobutylxanthate, lithium isopropylxanthate, sodium n-hexylxanthate, sodium 2-ethylhexylxanthate, potassium 2-butyloctylxanthate, sodium t-dodecylxanthate, etc.

As explained above, the composition of the reaction mixture obtained by chlorinating trithiane under the presently specified conditions—i. e., in substantially anhydrous medium and to an extent so as to introduce from one to three moles of chlorine per mole of trithiane—is not fully understood at the present time. It is, therefore, not possible to define by structural formula the biological toxicant materials obtained by reaction of the trithiane chlorination product with phosphite esters and xanthate salts as afforded by the process of this invention. In a preferred embodiment of this invention, the xanthate and the phosphite are reacted with the distillable portion of the trithiane chlorination product. The trithiane chlorination product distillate is known to contain bis(chloromethyl) disulfide and bis(chloromethyl) sulfide, possibly along with other materials such as, probably, more highly chlorinated dimethyl sulfides and sulfenyl chlorides. It has been disclosed in a copending application by one of the present inventors, Gail H. Birum, Serial No. 470,788, filed November 23, 1954, of common assignment herewith, that bis(chloromethyl) disulfide reacts with phosphites to form (dithiodimethylene)diphosphonate esters. It has further been disclosed in the copending application of Gail Birum, Serial No. 475,838, filed December 16, 1954, of common assignment herewith, that bis(chloromethyl) disulfide reacts with xanthates to form dithiodimethylene bis(alkylxanthate) esters. Accordingly, we surmise, although proof thereof is lacking and we do not wish to be limited in this invention by the speculation, that at least one of the active ingredients in the present reaction mixture is an ester of the formula

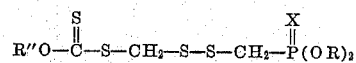

wherein one of the halogen atoms on the bis(chloromethyl) disulfide has been replaced by an alkylxanthate group, and the other of the halogen atoms in the bis-(chloromethyl) disulfide has been replaced by a dialkyl or bis(chloroalkyl) phosphonate or phosphonothioate radical. Probably the reaction mixture also contains at least some (dithiodimethylene)diphosphonate ester, and also at least some dithiodimethylene bis(alkylxanthate); additionally, reaction of the bis(chloromethyl) monosulfide present in the present reaction mixtures derived from the distillate of the trithiane chlorination product may produce equivalent structures wherein a single sulfur atom intervenes between two methylene radicals, particularly when the reaction is carried out at relatively elevated temperatures.

As disclosed in another copending application of common assignment herewith, Serial No. 578,862, filed April 18, 1956, by E. W. Gluesenkamp, G. H. Birum, and W. E. Weesner, chlorination of trithiane produces a composition which consists of about two-thirds, by weight, distillable materials. The one-third of the trithiane chlorination product which is not distillable is of unknown composition. In one embodiment of the present invention, an alkylxanthate and an alkyl or haloalkyl phosphite are reacted with the entire trithiane chlorination product, including the undistillable residue from the chlorination. When a total trithiane chlorination product or a trithiane chlorination product undistillable residue is reacted with an alkylxanthate and an alkyl or chloroalkyl phosphite in accordance with this invention, there will be obtained a complex reaction mixture which undoubtedly contains various phosphorus- and sulfur-containing products of structures other than that shown above. Thus, for example, any sulfenyl halides present in the trithiane chlorination product may react with phosphites to form thiophosphates. Phosphites may also react with disulfide linkages, cleaving the S—S bonds to produce thiophosphates. It is thus not intended that the present claims should be limited in any way by the above-recited specific structures.

In carrying out the process of the invention, there may be used trithiane which has been chlorinated by reaction with any of a variety of chlorinating agents effective to produce cleavage of the trithiane ring and replacement of hydrogen atoms attached to carbon atoms. Preferably, inorganic sulfur-containing chlorinating agents are used for the chlorination of trithiane; examples of these chlorinating agents are sulfur monochloride, sulfur dichloride, thionyl chloride and sulfuryl chloride. Alternatively, if desired, there may be used for the preparation of the chlorinated trithiane which is to be reacted with a phosphite and a xanthate in accordance with this invention, either liquid or gaseous chlorine. Mixtures of two or more of the above chlorinating agents are also useful in the chlorination of trithiane. To avoid the formation of sulfonyl chlorides or sulfones, as mentioned above, the chlorination should be carried on under substantially anhydrous conditions. For reaction with xanthates and phosphites in accordance with this invention to produce biological toxicants, the preferred trithiane chlorination products are those in which from one to three moles of chlorine have been introduced into the reaction products per mole of trithiane used; by moles of chlorine per mole of trithiane is here meant moles of molecular chlorine, i. e., of $Cl_2$, per mole of (—$CH_2S$—)$_3$. Thus, for example, from one to three moles of sulfuryl chloride may be reacted with one mole of trithiane, there being two molecules of chlorine present in each sulfuryl chloride molecule. Reaction of one mole of sulfuryl chloride with one mole of trithiane will then introduce two chlorine atoms per three —$CH_2S$— fragments in each atom of trithiane, while reaction of three moles of a chlorinating agent such as $SO_2Cl_2$ (sulfuryl chloride), $S_2Cl_2$ (sulfur monochloride) or $Cl_2$ (chlorine), etc., with one mole of trithiane would introduce six atoms of chlorine per three —$CH_2S$— fragments present in one trithiane atom.

Probably the chlorination products include compounds varying from unchlorinated or only mono-chlorinated products to perchlorinated sulfur-containing compounds such as perchloromethyl mercaptan and bis(trichloromethyl) sulfide, with all gradations between these stages being present in different degrees.

It is a further aspect of the present invention to react with the xanthates and phosphite esters herein disclosed as useful in the preparation of biological toxicants, either the entire trithiane chlorination product, or the fraction thereof which is distillable, or the fraction thereof which is non-distillable. (By non-distillable is here meant material which does not distill without degradation under usual laboratory or chemical plant vacuum distillation conditions, i. e., down to about 0.05 mm., it being recognized that special techniques such as molecular distillation may possibly be applied in unusual circumstances for the successful separation of high boiling materials which are for practical purposes non-distillable.) The products of reaction of xanthates and phosphites with the total trithiane chlorination product, the distillable fraction thereof, and the undistillable chlorination residue vary somewhat in effectiveness, but are all biological toxicants.

In carrying out the present process, the trithiane chlorination product made by chlorinating trithiane under anhydrous conditions so as to introduce from one to three moles of chlorine per mole of trithiane into the chlorination product is contacted with a phosphite ester of the formula $(RO)_2PXR'$, where R represents an alkyl or haloalkyl radical, R' is selected from R and an alkali metal, and X is oxygen or sulfur, and an alkylxanthate of the formula

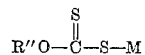

where R" is an alkyl radical and M is an alkali metal. The chlorinated trithiane may, if desired, be contacted with two or more different phosphite esters and with two or more xanthate esters, mixed phosphite and xanthate esters being equally as effective as the single reactants of this type.

In experiments with trithiane chlorination products, it has been found that the chlorination product contains chlorine which is reactive at low temperatures, i. e., at about 0° C. or below, and also chlorine which is reactive at slightly higher temperatures, on the order of from 10° C. up to room temperature, as well as chlorine which is reactive with phosphite esters and with xanthates at elevated temperatures, up to 100° C. and above. Generally, it is preferable to react the trithiane chlorination product with at least sufficient xanthate and phosphite to replace at least a major portion of the chlorine therein which is reactive at up to room temperatures, although it is possible to produce biological toxicants in accordance with this invention by replacement of as little as 1/20 mole equivalent of the chloride present in the trithiane chlorination product distillate. In a preferred embodiment of this invention, one of the reactants, i. e., either the xanthate or the phosphite, and preferably the phosphite, is contacted with the chlorinated trithiane or a portion thereof at a low temperature, about 0° C. or below, in amount sufficient to replace at least a major portion of the chlorine reactive at this temperature; then the temperature of the reaction mixture is raised to at least about room temperature and the reaction mixture is subsequently contacted with the other of the two reactants. Refluxing temperatures may then be employed to complete the reaction. When the process is carried out in accordance with this procedure, it is believed that the effect is to replace one of the chlorine atoms in bis(chloromethyl) disulfide during the reaction at the low temperature, and to replace the other of the chlorine atoms in bis(chloromethyl) disulfide in the reaction at the higher temperature, respectively with a phosphonate and with an alkylxanthate radical. However, it is not excluded to contact the trithiane chlorination product simultaneously with the xanthate and the phosphite, whereby it is probably more likely that, instead of a mixed phosphonate-xanthate, mixtures of diphosphonates and bis(alkylxanthates) are the primary products. Furthermore, in another embodiment of this invention, the trithiane chlorination product is reacted with a xanthate and a phosphite of the above-specified formulas, and the reaction mixture is raised to an elevated temperature to complete the reaction. In this case, we believe the chlorine in bis(chloromethyl) monosulfide becomes reactive and is replaced by xanthate and phosphonate radicals. The amounts of xanthate and phosphite to the reacted with the trithiane chlorination product in accordance with this invention to produce biological toxicant materials may range from as low as $\frac{1}{10}$ to $\frac{1}{20}$ of the mole equivalent of the chlorine present in the distillable portion of the trithiane chlorination product up to sufficient xanthate and phosphite to replace all of the chlorine present in the trithiane chlorination product.

Particularly in the embodiment of this invention which comprises reaction of the trithiane chlorination product with xanthate and phosphite at elevated temperatures, especially in the presence of sufficient xanthate and phosphite to replace more than about $\frac{1}{3}$ to $\frac{1}{4}$ of the chlorine present in the trithiane chlorination product distillate, temperatures up to below the decomposition temperatures of the reaction components may be employed. It is to be noted that the reactions believed to be taking place in the course of the process of this invention will produce alkali metal halides and alkyl or haloalkyl halides as byproducts. The completion of the present reaction may, therefore, be recognized by the cessation of formation of such halide byproducts.

If desired, inert solvents or diluents may be present in the reaction mixture of the chlorinated trithiane and xanthate and phosphite reactants. Thus, for example, trithiane may be mixed with a solvent such as hexane prior to chlorination and the resulting chlorination product solution may be reacted with the xanthate and phosphite directly. Alternatively, solvents or diluents such as benzene, hexane, or a mixture of isomeric pentanes, etc., may be added to the reaction mixture, or the reactants may be dissolved in such solvents before mixing, e. g., to facilitate control of the reaction. Generally, however, the reaction can be carried out directly in the absence of extraneous liquids without difficulty, and to avoid dilution of the biological toxicant products and the necessity for concentration thereof, direct reaction will be preferred. Furthermore, the reaction rate may, if desired, be enhanced by pressure variation or by the addition of catalysts, but generally the process proceeds at satisfactory rates without accelerating means.

The invention is illustrated but not limited by the following examples, wherein all temperatures given are ° C.

I. CHLORINATION OF TRITHIANE

A. *Chlorination of trithiane with sulfuryl chloride*

*Example 1.*—A mixture of 414 g. (3 moles) of trithiane and 500 cc. of carbon tetrachloride was cooled in ice and then 810 g. (6 moles) of sulfuryl chloride was added to the mixture over a period of three-quarters of an hour while the temperature of the reaction mixture was maintained at 2 to 10° C. When the addition was complete, the reaction mixture was heated at 80° for two hours, 130–135° for half an hour, and finally the temperature was raised to 147° to complete the reaction. There was obtained 764.5 g. of black viscous liquid product. A portion of the reaction mixture was distilled to remove material boiling up to 124°/1 mm. (pot temperature 143°), giving 525 g. of yellow distillate, and 129 g. of black liquid residue which was found by analysis to contain 4% carbon, 4.7% hydrogen, 29% chlorine and 61% sulfur.

Similarly reaction of a total of 1656 g. (12 moles) of trithiane with 3240 g. (24 moles) of sulfuryl chloride, in carbon tetrachloride, produced a reaction product, $n_D^{25}$ 1.5886, which gave on distillation 2110 g. of yellow distillate boiling at up to 131°/0.5 mm., containing 53% chlorine and 28% sulfur.

B. *Chlorination of trithiane with thionyl chloride*

*Example 2.*—A mixture of 966 g. (7 moles) of trithiane and 1666 g. (14 moles) of thionyl chloride was placed in a three-liter four-necked flask provided with stirrer, thermometer and condenser. The reaction mixture was heated gradually over a period of about thirty hours to a final temperature of 131° C. After removal of 98.5 g. of material boiling up to 74°/50 mm., the reaction product was fractionated, to yield 1130.5 g. of orange liquid boiling at from 74°/50 mm. to 95°/0.5 mm. and containing 31% sulfur and 50% chlorine. There remained in the flask 630 g. of black residue which was found by analysis to contain 65% sulfur and 24% chlorine.

Similarly, reaction of 254 g. (1.84 moles) of trithiane in 200 ml. of methylene dichloride with 329 g. (2.76 moles) of thionyl chloride, with the introduction of a total of 131 g. (1.84 moles) of chlorine into this reaction mixture at below −20°, gave a reaction mixture which evolved HCl on heating. The mixture was held at 40–67° for 16 hours, distilled to remove methylene chloride, and then heated at 90–120° for an additional three hours. Distillation of the reaction mixture to remove material boiling at up to 60°/30 mm. (pot temperature 77°) took off 10–15 g. of distillate, leaving 434 g. of a red-brown liquid reaction product, $n_D^{25}$ 1.6099. A portion of this reaction product was distilled, whereby there were obtained 127.5 g. of brown liquid residue boiling above 105°/2 mm. (pot temperature 132°) and 246 g. of yellow distillate, $n_D^{25}$ 1.5569. Fractionation of part of the distillate yielded 123.8 g. of bis(chloromethyl) sulfide, $n_D^{25}$ 1.53, B. 41–43°/10 mm., and 44.1 g. of bis(chloromethyl) disulfide, $n_D^{25}$ 1.5859, B. 58–59°/2–1.5 mm. Accordingly, this chlorination procedure produced a yield of approximately 13.6% bis(chloromethyl) disufide calculated on trithiane. The remainder of the reaction product consisted of bis(chloromethyl) monosulfide and other unidentified material.

II. REACTION WITH XANTHATE AND PHOSPHITE ESTERS

A. *With alkyl phosphites*

*Example 3.*—A 75 g. portion of the yellow distillate produced as described in the first paragraph of Example 1 was cooled in a Dry Ice bath and 35.4 g. (0.213 mole) of triethyl phosphite added over a period of 10–15 minutes while the temperature of the reaction mixture was held at −8 to +2° C. The reaction mixture was then allowed to warm to room temperature and transferred to a dropping funnel, from which it was added, dropwise, to a suspension of 60.7 g. (0.42 mole) of dry potassium ethylxanthate in benzene over a period of 20 minutes. The reaction temperature was within the range of 28–40° during this period. After the addition was complete, the mixture was refluxed for 45 minutes and then stirred and filtered. The filter cake was washed twice with benzene and the combined filtrates were concentrated to a boiling point of 80° (pot temperature 111°) under a slight (water pump) vacuum. The reaction product was an orange liquid, $n_D^{25}$ 1.5585, weighing 108.5 g. It contained 11.68% chlorine, 35.76% sulfur, and 4.54% phosphorus.

*Example 4.*—A 54 g. portion of the trithiane chlorination product distillate, obtained as described in the first paragraph of Example 2, was placed in a 500 ml. four-necked flask and cooled in a Dry Ice bath. Freshly distilled trimethyl phosphite was added slowly to the reaction mixture over a period of 10–15 minutes, while the temperature of the reaction mixture was held at −12 to −8° until the exothermic reaction appeared complete. The addition consumed 16.3 g. (0.131 mole) of the phosphite ester. The reaction mixture was then warmed to room temperature and transferred to a dropping funnel, from which it was added rapidly to a suspension of 107 g. (0.669 mole) of potassium ethylxanthate in 300 ml. of benzene. There was no indication of exothermic reaction. The mixture was refluxed for 5 hours, and then cooled, mixed with a commercial filter aid and let stand overnight. After this, the upper liquid layer was decanted from the solid material in the flask and filtered, while the solid-containing layer was transferred to the filter and then washed twice with benzene. The combined filtrates were concentrated to 50° under water-pump vacuum and then refiltered. This second filtrate was concentrated to a pot temperature of 71°/3 mm. to give 91 g. of a cloudy yellow liquid residue containing chlorine, sulfur, and phosphorus.

Similarly, the total trithiane chlorination product, obtained as described in Example 1, is reacted with sodium bis(2-ethylhexyl) phosphite and sodium methylxanthate, the phosphite and xanthate esters being added immediately one after the other, dropwise, at room temperature, exothermal reaction occurring. The mixture is then heated up to reflux to complete the reaction, filtered to remove byproduct sodium chloride, and distilled to remove solvent. There is obtained a biological toxicant reaction product containing phosphorus, chlorine, and sulfur.

B. Haloalkyl phosphites

*Example 5.*—A 54 g. portion of the trithiane chlorination product distillate, prepared as described in the first paragraph of Example 2, was placed in a 500 ml. four-necked flask and cooled in Dry Ice to −10° C. Tris(β-chloroethyl) phosphite was then added, dropwise, to the reaction mixture, with cooling. A total of 35.1 g. (0.13 mole) of the phosphite was added. The reaction mixture was then warmed to 40°, transferred to a dropping funnel, and added gradually, over a period of less than 10 minutes, to a suspension of 38.0 g. (0.26 mole) of potassium methylxanthate in 200 ml. of benzene, while the reaction mixture temperature was held at 70–75° C. The mixture was then refluxed at 85–88° for 3 hours, after which it was allowed to cool to 60°, mixed with 10 g. of a commercial filter aid, and let stand overnight. It was filtered, the filter cake being washed three times with benzene, and the combined filtrates were concentrated to a pot temperature of 110° under water-pump vacuum of about 20 mm. There was obtained a distillate boiling at 62°, which was probably bis(chloromethyl) monosulfide, and a residue of a yellow liquid, $n_D^{25}$ 1.5752, weighing 71.3 g. The product contained 31.28% sulfur and 5.38% phosphorus.

The products of this invention are useful for a variety of chemical and agricultural purposes. Thus, for example, they may be used as biological toxicants, e. g., as insecticides, soil fumigants, herbicides, fungicides, bactericides, etc. They are particularly useful as nematocides and insecticides.

The evaluation of the present compounds as nematocides is described in the following examples.

*Example 6.*—*Nematocidal activity in aqueous suspension*: It is known that a nematode when placed in water flexes its body at a more or less constant rate and that the effect of a nematocide can be estimated reasonably accurately by counting the rate of this flexing action. This motility is observed through a microscope and the number of flexures counted, the effect of a nematocide being expressed as the percentage of the normal flexing rate of a control dispersion of nematodes not containing a nematocidal agent.

An emulsion of the product of Example 3 was prepared by dissolving 1 g. of the reaction product in a few ml. of acetone, adding an emulsifying agent known to the trade as "Tween 20" and reputed to be a polyoxyethylene sorbitan monolaurate, and bringing the mixture up to 50 ml. with water, giving an aqueous emulsion containing 2% by weight of the phosphorus-containing reaction product. Aqueous suspensions of the nematode *Panagrellus redivivus* were placed in Stender dishes and concentrations of 0.1% and 0.01% of the reaction product, calculated on the volume of the nematode suspension, were added to the Stender dishes, after which motility of the nematodes was estimated at regular intervals as compared to a control nematode suspension containing no added test chemical. It was found that the motility of the nematodes in the suspension containing an 0.1% concentration of the reaction product was reduced to 25% of that of the control after 2 hours. At the end of 24 hours, the nematodes in the suspension containing the reaction product of Example 3 were completely motionless, while the control suspension still had the same activity as at the start of the test. In the suspension containing an 0.01% concentration of the reaction product of Example 3, the motility of the nematodes had been reduced to 20% of that of the control suspension in 24 hours.

*Example 7.*—*Nematocidal activity in soil*: Two batches of 500 g. each of uninfested soil were placed in containers. The soil was then inoculated with the root knot nematode *Meloidogyne spp.* by addition to each container of 25 ml. of a suspension prepared by grinding 2 g. of roots of plants infected by the nematodes in 100 ml. of water. After the soil had been inoculated, sufficient water was added to it to bring it to one-half field capacity. The two lots of infected soil were then drenched with emulsions prepared as described above, to give, respectively, 0.1 and 0.01% concentrations in the soil of the reaction product of Example 3; the containers were then capped and allowed to stand one week, after which a two-week old Marglobe tomato seedling was transferred to each container. An untreated but similarly inoculated control was also planted. After a growing period of two months, the tomato plants were harvested and the roots washed and examined for evidence of infection. Both at the 0.1% and the 0.01% concentrations, the reaction product of Example 3 completely suppressed nematode infection in the plants grown in infected soil, while exhibiting negligible phytotoxicity.

The present reaction products are effective in eliminating or suppressing nematode activity when applied to the soil at a rate of 50–500 lbs. per acre. Usually, concentrations of 100–200 lbs. per acre will produce effective nematode control in soils of average infestation level. Lightly infected areas may be treated effectively with smaller concentrations. The reaction products may be applied to the soil either directly, as by injection into the soil, or in the form of compositions containing the reaction products as active nematocidal ingredients. To attain even distribution of the present nematocidal materials in the soils, it is preferred to incorporate them with an inert carrier which may be solid or liquid. If desired, the present reaction products may be applied as a dust, i. e., in admixture with a solid carrier. Examples of solid inert carriers useful in the present application are talc, fuller's earth, bentonite, diatomaceous earth, etc. If desired, the nematocidal dust containing one of the present reaction products as an active ingredient may also be admixed with soil-conditioning agents, fertilizers, or other agricultural agents.

Alternatively, the present products may be prepared in the form of compositions which are emulsifiable concentrates, suitable for application of the compositions to soils as liquid applications, e. g., in irrigation water. Thus, for example, the reaction product is diluted in an organic solvent such as acetone and then mixed with an emulsifying agent such as long-chain alkylbenzenesulfonate, polyalkylene glycol, salts of a sulfated long-chain alcohol, sorbitan fatty acid ester, etc., to form an emulsifiable concentrate suitable for the preparation of aqueous nematocidal emulsions.

The present products or compositions containing the same are also effective as insecticides and serve as general soil sterilants; moreover, because of their moderate to low phytotoxicity, the soil so treated may immediately be used for crop planting, an unusual extra advantage of the present compositions.

As insecticides, the novel compositions provided by this invention are particularly active as systemic plant protectants, and as contact sprays. Thus, for example, 100% kill of the mobile and resting stages of spider mites, Tetranychus *spp.*, is obtained when plants infested with the mites are dipped in an aqueous emulsion containing an 0.013% concentration of the product of Example 3. A three day immersion of the cut stems of bean plants in an 0.00025% emulsion of the Example 3 reaction product, followed by infestation of the leaves with Tetranychus *spp.* mobile stages and with second instar Mexican bean beetle (*Epilachna varivestis*) larvae, produced 100% kill of each of these species within 48 hours. In other tests, toxicity as a plant systemic insecticide against the cotton aphid, *Aphis gossypii*, as a contact and residual toxicant to the large milkweed bug (*Oncopeltus fasciatus*) and as a contact toxicant to yellow fever mosquito (*Aedes aegypti*) larvae was also demonstrated.

The novel compounds of the invention may be applied directly to insect species to be combatted, e. g., by spraying, or they may be applied to plants, in a manner so as to function either as systemic or as contact insecticides, in advance of an anticipated infestation. Dust, emulsion or solution formulations may be employed for such application; furthermore, adhesive and wetting agent additives may be employed in the compositions of the invention to assist in the distribution thereof on the surfaces to be protected from insect attack. The concentrations of the present reaction products employed in insecticidal and miticidal formulations will depend on the particular reaction product utilized, the insect species to be attacked, the mode of action chosen—whether systemic or contact—etc.; a typical formulation, for example, may contain 0.1% active ingredient, together with 0.1% wetting agent, and the residue inert carrier. Effective concentrations for use under particular circumstances may readily be determined by those skilled in the art.

The compounds provided by this invention have additionally been demonstrated to be of interest as industrial preservatives. At a concentration of 100 parts per million, the product of Example 3, incorporated in agar, inhibits the growth of such bacteria and fungus species as *Micrococcus pyogenes* var. *aureus*, *Salmonella typhosa*, *Aspergillus niger*, etc.

The present reaction products when prepared from higher alkyl phosphites can also be employed in lubricating oils and greases as extreme pressure agents, oxidation inhibitors, etc., and as fire-proofing agents and stabilizing agents in plasticizers, as improving agents for hydrocarbon fuels, etc.

While the invention has been described with particular reference to various preferred embodiments thereof, it will be appreciated that numerous modifications and variations are possible without departure from the invention, and the invention is not to be limited to any specific embodiment thereof except as defined in the appended claims.

What is claimed is:

1. The process which comprises contacting a phosphite ester of the formula $(RO)_2PXR'$ where R is selected from the class consisting of alkyl chloroalkyl and bromo alkyl radicals, R' is selected from the group consisting of R and alkali metal, and X is selected from the class consisting of oxygen and sulfur, and an alkylxanthate salt of the formula

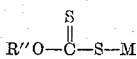

where R" is an alkyl radical and M is an alkali metal, with at least a portion of the product of chlorination of trithiane under substantially anhydrous conditions to introduce from one to three moles of chlorine per mole of trithiane into the chlorination product, and thereby forming a phosphorus- and sulfur-containing biological toxicant product.

2. The process which comprises chlorinating trithiane under substantially anhydrous conditions to introduce from one to three moles of chlorine per mole of trithiane into the chlorination product, isolating from the resulting chlorination product a fraction distillable without decomposition at down to about 0.1 mm., contacting the said distillable fraction with a phosphite ester of the formula $(RO)_2PXR'$ wherein R is selected from the class consisting of alkyl chloroalkyl and bromoalkyl radicals, R' is selected from the group consisting of R and alkali metal, and X is selected from the class of oxygen and sulfur, and an alkylxanthate salt of the formula

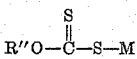

where R" is an alkyl radical and M is an alkali metal, and thereby forming a phosphorus- and sulfur-containing biological toxicant product.

3. The process of claim 2, wherein the said phosphite ester is a tri(lower alkyl) phosphite of the formula $(RO)_3P$ where R is a lower alkyl radical, and the said xanthate is a potassium lower-alkylxanthate.

4. The process of claim 1, wherein the said phosphite ester is a tris(haloalkyl) phosphite of the formula $(RO)_3P$ wherein R represents a halogen-substituted lower alkyl radical said halogen being selected from chlorine and bromine, and the said xanthate is a potassium lower-alkylxanthate.

5. The process of claim 2, wherein the distillable fraction of the trithiane chlorination product is contacted with trimethyl phosphite and with potassium ethylxanthate.

6. The process of claim 2, wherein the distillable fraction of the trithiane chlorination product is contacted with triethyl phosphite and potassium ethylxanthate.

7. The process of claim 2, wherein the distillable fraction of the trithiane chlorination product is contacted with tris($\beta$-chloroethyl) phosphite and potassium methylxanthate.

8. The product of the process of claim 1.
9. The product of the process of claim 2.
10. The product of the process of claim 3.
11. The product of the process of claim 4.
12. The product of the process of claim 5.
13. The product of the process of claim 6.
14. The product of the process of claim 7.
15. A biological toxicant composition comprising an inert carrier and as the essential effective ingredient the product of the process of claim 1.
16. A biological toxicant composition comprising an emulsifiable concentrate of the product of the process of claim 6 and a surface active agent.
17. The method of inhibiting the growth of living organisms which comprises exposing said organisms to a toxic quantity of the product of the process of claim 1.
18. The method of killing nematodes which comprises exposing said nematodes to a toxic quantity of the product of the process of claim 1.
19. The method of killing insects which comprises exposing said insects to a toxic quantity of the product of the process of claim 1.

No references cited.